US008134097B2

(12) United States Patent
Schneider

(10) Patent No.: US 8,134,097 B2

(45) Date of Patent: Mar. 13, 2012

(54) MULTI-POSITION HEAD PLASMA TORCH

(75) Inventor: Joseph C. Schneider, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1360 days.

(21) Appl. No.: 10/711,102

(22) Filed: Aug. 23, 2004

(65) Prior Publication Data

US 2006/0037947 A1 Feb. 23, 2006

(51) Int. Cl.
*B23K 10/00* (2006.01)

(52) U.S. Cl. ................ 219/121.48; 219/121.39; 219/75; 219/124.33

(58) Field of Classification Search ............. 219/121.39, 219/121.44, 121.59, 121.48, 121.52, 121.36, 219/74, 75, 124.1, 124.31, 124.33, 121.4
See application file for complete search history.

(56) References Cited

U.S. PATENT DOCUMENTS

| | | | | |
|---|---|---|---|---|
| 3,573,419 | A * | 4/1971 | Henderson | 219/70 |
| 3,748,433 | A * | 7/1973 | Gwin et al. | 219/124.34 |
| 4,698,480 | A * | 10/1987 | Klingel | 219/121.67 |
| 4,778,155 | A | 10/1988 | Suchevich et al. | |
| 5,026,966 | A * | 6/1991 | Roth | 219/121.72 |
| 5,338,917 | A * | 8/1994 | Stuart et al. | 219/137.63 |
| 5,558,268 | A | 9/1996 | Acheson | |
| 5,916,465 | A * | 6/1999 | New et al. | 219/138 |
| 6,095,801 | A | 8/2000 | Spiewak | |
| 6,262,386 | B1 * | 7/2001 | Fornsel | 219/121.52 |
| 6,380,508 | B1 * | 4/2002 | Sorkin | 219/121.39 |

FOREIGN PATENT DOCUMENTS

| | | |
|---|---|---|
| EP | 1631129 A2 | 3/2006 |
| RU | 2041777 | 8/1995 |

OTHER PUBLICATIONS

European Patent Office, Search opinion and report for EP1631129, dated Feb. 16, 2009.

* cited by examiner

*Primary Examiner* — Mark Paschall
(74) *Attorney, Agent, or Firm* — Fletcher Yoder, P.C.

(57) ABSTRACT

A plasma torch having a multi-position head is disclosed. The plasma torch includes a torch body and a torch head pivotably connected thereto. Such a construction provides a single plasma torch having several head-to-handle orientations thereby providing a highly versatile plasma torch assembly.

15 Claims, 3 Drawing Sheets

MULTI-POSITION HEAD PLASMA TORCH

BACKGROUND OF THE INVENTION

The present invention relates generally to plasma cutting systems and other high power output welding-type systems such as welding and induction heating systems and, more particularly, to a multi-position head for a torch for use with such systems.

Plasma cutting is a process in which an electric arc is used for cutting a workpiece. Plasma cutters typically include a power source, an air supply, and a torch. The torch, or plasma torch, is used to create and maintain the plasma arc that performs the cutting. A plasma cutting power source receives an input voltage from a transmission power line or generator and provides output power to a pair of output terminals, one of which is connected to an electrode and the other of which is connected to the workpiece.

An air supply is used with most plasma cutters to help start the arc, provide the plasma gas to the torch, and cool the torch. Positioned within a head portion of the plasma torch, a movable or fixed electrode or consumable serves as a cathode and a fixed or moveable nozzle or tip serves an anode. In some such units, the air supply is used to force a separation of the electrode and tip to create an arc. The arc initiates a plasma jet that is forced out through the opening in the nozzle by the compressed air. The plasma jet causes the arc to transfer to the workpiece, and thus initiates the cutting process. In other plasma cutting systems, a high frequency starter can be used to initiate the arc, and still others can employ high voltage to initiate the arc.

During the cutting process, an operator is occasionally required to assume awkward positions to orient the head portion of the plasma torch relative to the workpiece to perform a desired cutting process. That is, in dynamic work environments, an operator may desire to perform horizontal, vertical, overhead, and corner cutting in a generally sequential cutting process, or simply need to orient the torch in a manner that a standard ninety-degree torch head does not readily accommodate. During such variable cutting processes, the relationship of the torch head to the handle of the torch can interfere with an operator's ability to perform a desired cutting process.

As an operator performs a cutting process, there are instances when it would be preferable to have the torch head generally parallel with the torch handle, and other instances when it would be desirable to have the torch head oriented at angles other than parallel with the torch handle. Known torch assemblies require the operator to physically change torch tips or the entire head portion of the torch assembly or replace the entire torch in order to change the relative position between the torch head and the torch handle. Such a requirement is time consuming and reduces the efficiency of cutting operations. Additionally, an operator must store and maintain a plurality of torch heads or torch assemblies having different operating orientations.

It would therefore be desirable to design a multi-position torch head that can be quickly and repeatably adjusted to a plurality of operating positions.

BRIEF DESCRIPTION OF THE INVENTION

The present invention is directed to a multi-position torch that solves the aforementioned problems. The present invention provides a plasma torch assembly that includes a head portion that is rotatably connected to a handle portion. The head portion is rotatable between a number of cutting positions thereby forming a plasma torch having a plurality of operating positions.

Therefore, in accordance with one aspect of the present invention, a plasma cutting torch including a torch body and a torch head is disclosed. The torch head has a restricted pivotable connection to the torch body and is configured to generate a cutting arc at a plurality of angles relative to the torch body.

In accordance with another aspect of the present invention, a plasma cutting assembly including a power source is defined. A plasma torch is electrically connectable to the power source and a multi-position head is ratchetably connected to the plasma torch.

In accordance with yet another aspect of the present invention, a plasma torch including a handle portion and a work tip portion is disclosed. The disclosed plasma torch includes means for providing restricted adjustment of a position of the work tip portion relative to the handle portion when the work tip portion is connected to the handle portion.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
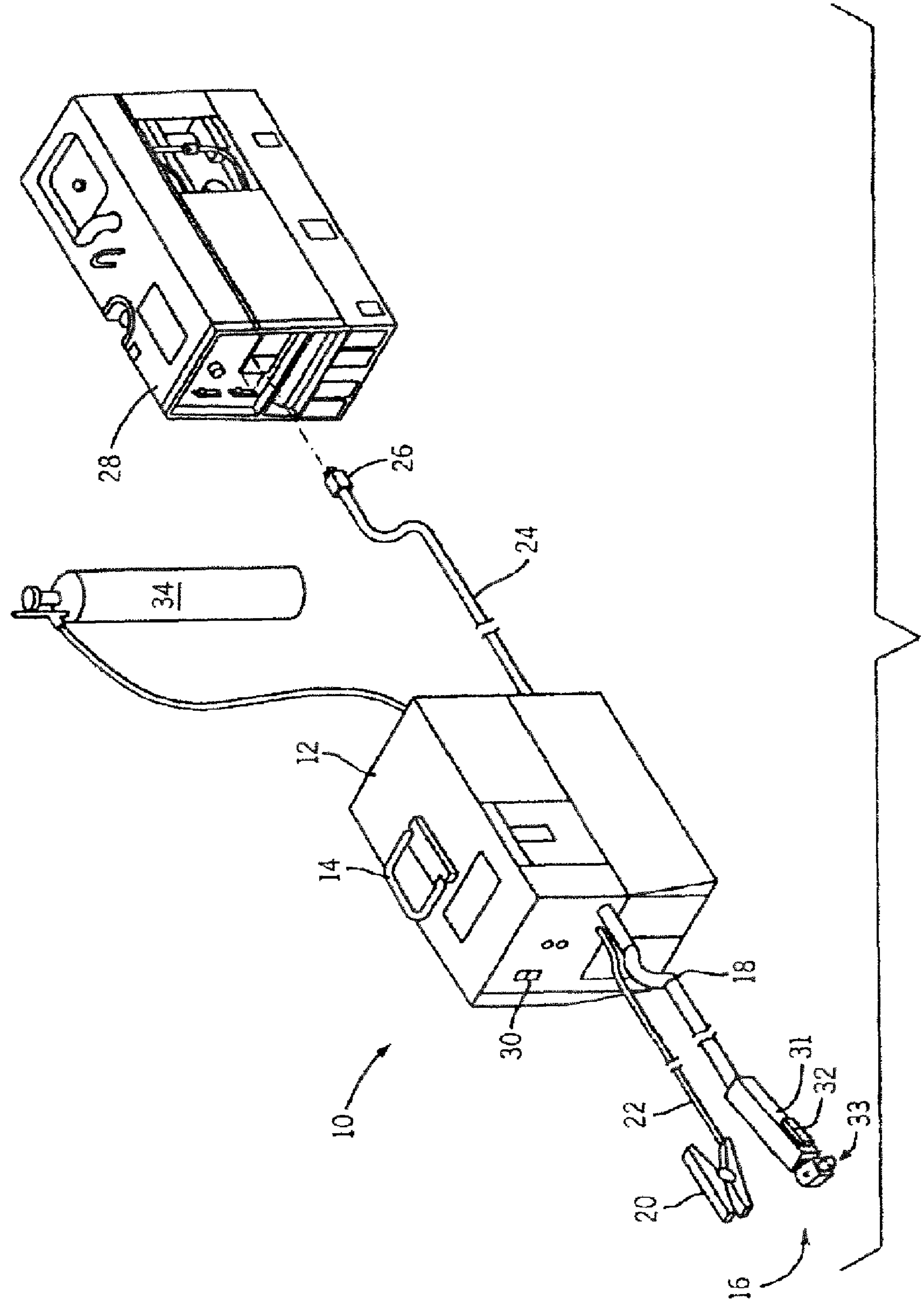
FIG. 1 is a perspective view of a plasma cutting system incorporating the present invention.

FIG. 1 shows a plasma cutting system 10 according to the present invention. The plasma cutting system is a high voltage system with open circuit output voltages ranging from approximately 230 Volts Direct Current (VDC) to over 300 VDC. The plasma cutting system 10 includes a power source 12 to condition raw power and regulate/control the cutting process. Specifically, the power source 12 includes a processor that, as will be described, receives operational feedback and controls the plasma cutting system 10 accordingly. Power source 12 includes a lifting means 14, such as a handle, which effectuates transportation from one site to another. Connected to the power source 12 is a torch 16 via cable 18. The cable 18 provides the torch 16 with power and compressed air, and also serves as a communications link between the torch 16 and power source 12. The torch includes a torch body, or handle 31, having a trigger 32 thereon, and a rotatable work tip, or head portion 33 extending therefrom.

Also connected to power source 12 is a work clamp 20 which is designed to connect to a workpiece (not shown) to be cut and provides a return path, or grounding path. Connecting work clamp 20 to the power source 12 is a cable 22 designed to provide a return path for the cutting current from the torch through the workpiece and the work clamp 20. Extending from a rear portion of power source 12 is power cable 24 having plug 26 for connecting the power source 12 to either a portable power supply 28 or a transmission line power receptacle (not shown). Power source 12 includes an ON/OFF switch 30 and may also include amperage and air pressure regulation controls, indicator lights, and a pressure gauge.

To effectuate cutting, torch 16 is placed in close proximity to a workpiece connected to clamp 20. A user may then activate trigger 32 on torch 16 to deliver compressed air and power to head portion 33 of torch 16 to initiate a pilot arc. Shortly thereafter, a cutting arc is generated as the user moves the torch to the workpiece. The arc transfers from the electrode to the workpiece through the tip. The user may then cut the workpiece by moving the torch thereacross. The user may adjust the speed of the cut to reduce spark splatter and provide a more-penetrating cut by adjusting amperage and/or air pressure. Gas is supplied to torch 16 from a pressurized gas source 34, from an internal air compressor, or an external air compressor.

Figure 2:
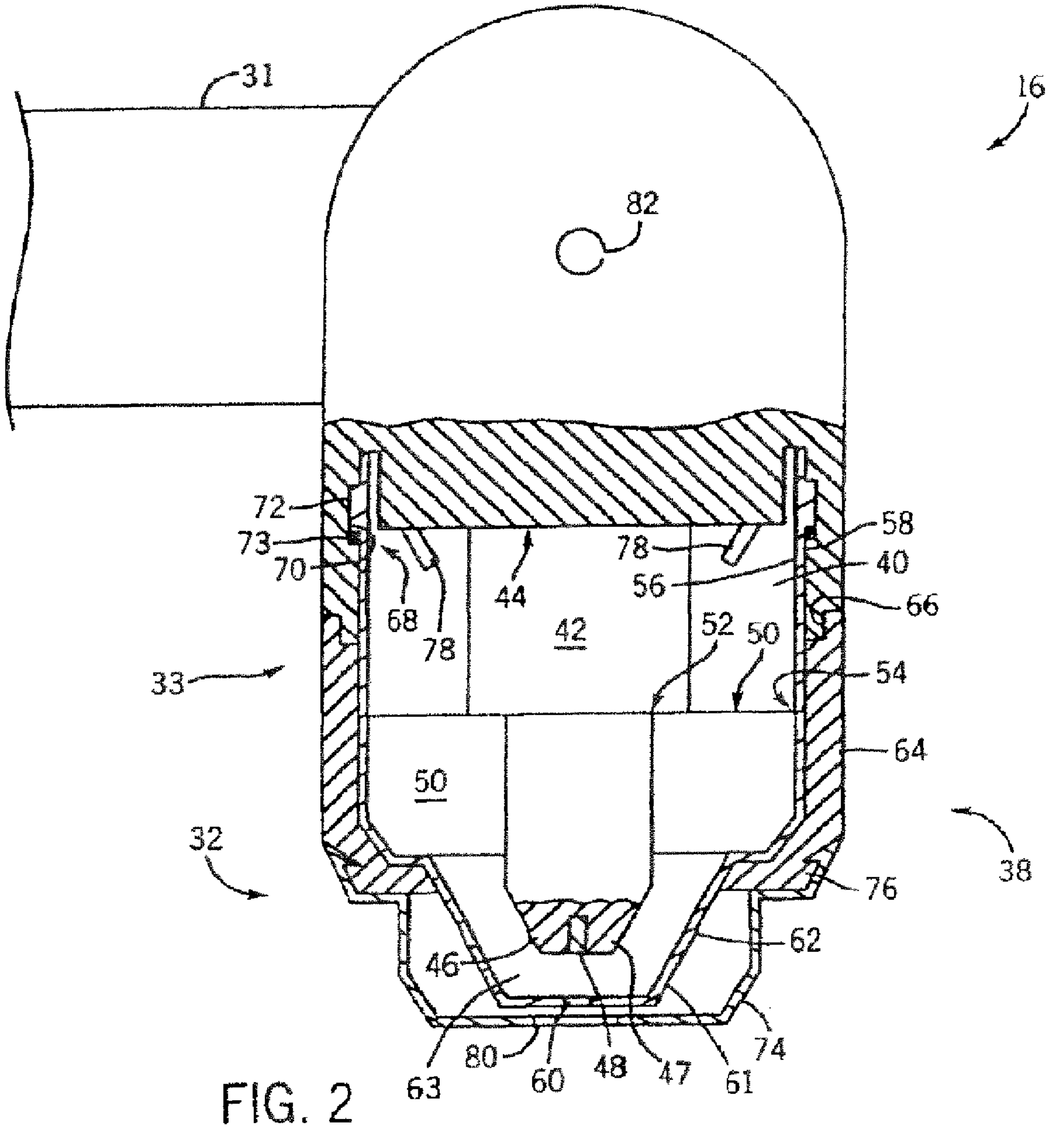
FIG. 2 is a partial cross-sectional view of the torch shown in FIG. 1.

Referring now to FIG. 2, head portion 33 of the plasma cutting torch 16 is shown in partial cross-section. Plasma torch 16 is defined by a torch body 31 that is constructed to be rotatably connected to head portion 33 of torch 16. A consumable assembly 38 is positioned in head portion 33 and rotates therewith. Consumable assembly 38 is connected to head portion 33 so as to define a gas chamber 40 that, as will be described in greater detail below, allows for the charging of the gas and passage of the gas therefrom. Centrally disposed within gas chamber 40 is an electrode 42. Electrode 42 has a base 44 that electronically communicates with power source 12 through torch body 31 independent of the position of head portion 33 relative to torch body 31. Electrode 42 includes an electrode tip 46 at an opposite end 47 from the base 44 of the electrode 42. Electrode tip 46 has an insert 48 formed therein that exhibits certain preferred electrical, thermal, and chemical properties. Insert 48 is preferably formed of hafnium or zirconium, the importance of which is well known in the art.

Electrode 42 has a swirl ring 50 positioned thereabout. Optionally, electrode 42 may be press-fit into an opening 52 formed generally in the center of swirl ring 50. An outer diameter 54 of swirl ring 50 is positioned within an inner surface 56 of a tip 58. Tip 58 generally encircles electrode 42 and swirl ring 50 and includes an orifice 60 at an end 61 thereof. Orifice 60 is positioned generally adjacent to insert 48 of electrode 42 and is constructed to allow the passage of an electrical arc therethrough. Tip 58 also has a nozzle portion 62 formed about orifice 60 and end 47 of electrode 42. Nozzle portion 62 is constructed to direct the plasma flow from a plasma chamber 63 into a concentrated, highly charged, plasma flow. The plasma chamber 63 is formed in the space between electrode 42 and nozzle portion 62 of tip 58. During a cutting process, the pilot arc is generally formed in plasma chamber 63 between electrode 42 and tip 58 to cause generation of the plasma gas.

A shield cup 64, or cap, passes over nozzle portion 62 of tip 58 and engages an end 66 of head portion 33. Shield cup 64 is constructed to snuggly engage tip 58 so that tip 58 is securely connected thereto. Tip 58 includes a torch end 68 with a tab 70 formed thereat. Tab 70 engages a channel 72 formed in head portion 33 and allows consumable assembly 38 to be connected to head portion 33 of torch 16. Alternatively, it is understood that tip 58 could be threadingly connected to torch 16. An O-ring 73 is disposed between tab 70 of tip 58 and head portion 33 to seal the assembly and prevent the escape of gas therebetween. It is understood that swirl ring 50 is not necessary for certain plasma cutting processes and that the swirl ring is sometimes integrally connected to the torch body 31.

A shield 74 is connected to shielding cup 64 about an end 76 thereof and is constructed to maintain an appropriate arc distance between insert 48 of electrode 42 and a workpiece. In operation, gas is injected into chamber 40 via a plurality of passages 78. The gas passes through swirl ring 50 and into plasma chamber 63 where it is heated to a plasma state. The plasma is then forced out of plasma chamber 63, through nozzle portion 62, and out tip 58 via orifice 60. The plasma exits consumable assembly 38 at an opening 80 in shield 74. Nozzle portion 62 is designed to focus the velocity as well as the heat of an arc that is created between a workpiece (not shown) and insert 48 of electrode 42. A cutting arc emits from insert 48 and travels to a workpiece in the plasma flow through orifice 60 and opening 80 of torch 16. Insert 48 is constructed to be conductive and to resist deterioration associated with the high temperature arc which swirls thereabout.

A pin 82 pivotably connects head portion 33 of plasma torch 16 to torch body 31. Rotation of head portion 33 relative to torch body 31 allows head portion 33 to be independently positionable relative to torch body 31. Such a construction forms a plasma torch having multiple operating orientations as discussed further below.

Figure 3A:
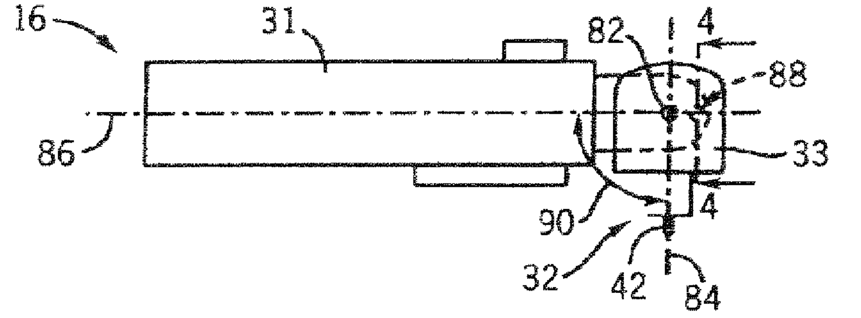
FIG. 3*a* is an elevational view of the plasma torch shown in FIG. 1 with a head portion of the plasma torch in a first position.
Figure 3B:
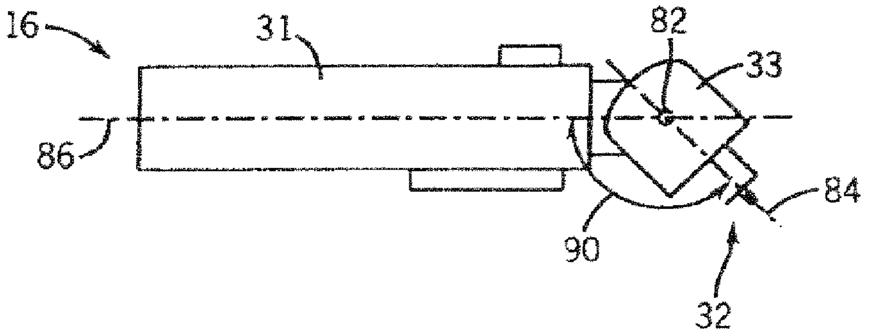
FIG. 3*b* is an elevational view of the plasma torch in FIG. 3*a* with the head portion of the plasma torch in another position.

FIGS. 3*a*-3*d* show the variable predetermined operating orientations of plasma torch 16, each of which can be described as an exemplary predefined set point. As shown in FIG. 3*a*, head portion 33 of plasma torch 16 is oriented generally perpendicular to torch body 31. An axis, indicated by line 84, extends through a center of electrode 42 of work tip 32 and through pin 82 and is generally perpendicular to an axis, indicated by line 86, formed along torch body 31 and generally aligned with pin 82. Additionally, an indexing mechanism 88, shown in phantom, references this orientation and indicates to an operator that head portion 33 is oriented generally perpendicular to torch body 31. As shown in FIG. 3*b*, head portion 33 is rotatable relative to torch body 31 from the orientation shown in FIG. 3*a*. As shown in FIG. 3*b*, an angle 90 formed between axis 86 of torch body 31 and axis 84 of head portion 33 is increased as head portion 33 is rotated about pin 82. Angle 90 in FIG. 3*b* is approximately 135 degrees and indicates an approximately 45 degree change in the orientation of head portion 33 relative to torch body 31 as compared to that orientation shown in FIG. 3*a*.

Figure 3C:
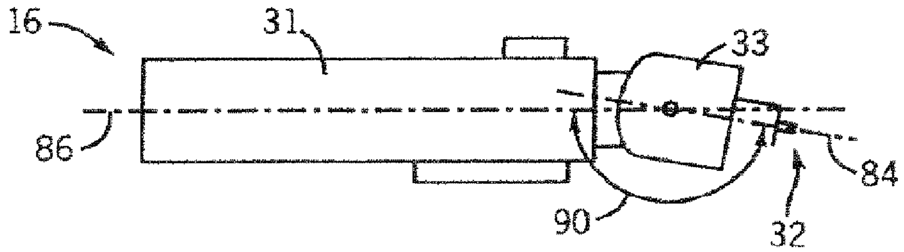
FIG. 3*c* is an elevational view of the plasma torch in FIG. 3*a* with the head portion of the plasma torch in a further position.
Figure 3D:
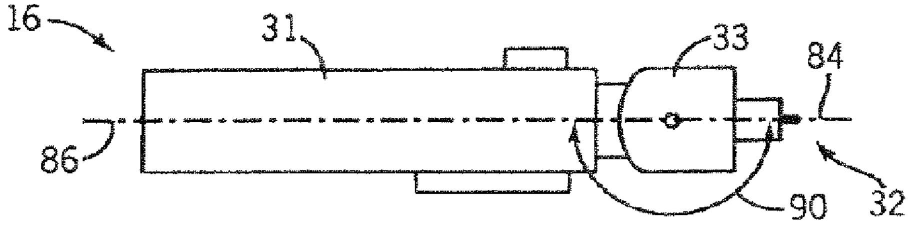
FIG. 3*d* is an elevational view of the plasma torch in FIG. 3*a* with the head portion of the plasma torch moved to yet another position.

FIG. 3*c* shows another predetermined orientation of head portion 33 relative to torch body 31. As shown in FIG. 3*c*, axis 84 of head portion 33 is approximately 170 degrees from axis 86 of torch body 31 and is indicated generally by angle 90. Preferably, angle 90 shown in FIG. 3*c* is approximately 170 degrees. FIG. 3*d* shows yet another orientation of head portion 33 relative to torch body 31. As shown in FIG. 3*d*, axis 84 of head portion 33 is generally aligned with axis 86 of torch body 31. As such, angle 90 shown in FIG. 3*d* is approximately 180 degrees. Accordingly, torch 16 includes a plurality of predetermined operating orientations between a generally perpendicular orientation, as shown in FIG. 3*a*, and a generally linear orientation, as shown in FIG. 3*d*. That is, head portion 33 is indexable from a 90 degree orientation, as shown in FIG. 3*a*, a 135 degree orientation, as shown in FIG. 3*b*, a 170 degree orientation as shown in FIG. 3*c*, or a 180 degree orientation as shown in FIG. 3*d*, relative to torch body 31.

Each of the orientations shown in FIG. 3*a*-3*d* is indicative of a predetermined position of head portion 33 relative to torch body 31 that is preferable for certain operating conditions. As such, each of the orientations of head portion 33 relative to torch body 31 defines predetermined orientations. It is understood that each of the predetermined operating orientations discussed above are merely exemplary and do not limit the scope of the claims. It is further understood that a plasma torch according to the present invention could be provided with predetermined operating orientations other than those shown.

Figure 4:
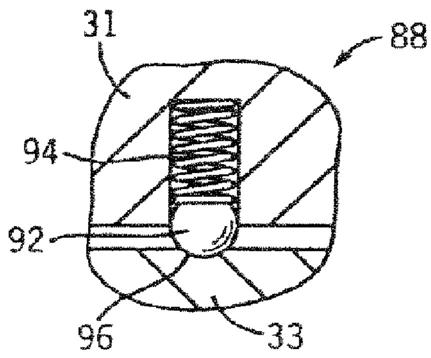
FIG. 4 is a partial cross-sectional view of the plasma torch shown in FIG. 3*a* along line 4-4.

As shown in FIG. 4, indexing mechanism 88, or ratchet, includes a ball 92 and a spring 94 generally disposed between head portion 33 and torch body 31. Head portion 33 includes a plurality of recesses indicated generally by recess 96. Recess 96 is indicative of one position of head portion 33 relative to torch body 31 such that rotation of head portion 33 results in ball 92 engaging a subsequent recess 96. Spring 94 biases ball 92 into recess 96 and indicates to an operator that the head portion 33 has reached any of the predetermined orientations shown in FIGS. 3*a*-3*d*. Additionally, it is understood and within the scope of the claims that indexing mechanism 88 ratchets between the plurality of predetermined positions of head portion 33 relative to torch body 31. It is equally understood that although only four specific operating orientations are shown, many variations exist and are within the scope of the claims. Such orientations are only limited by an operator's desire to have the head portion 33 orientated in a specific configuration relative to torch body 31. As such, a plasma torch according to the present invention provides an operator thereof with a plurality of predetermined plasma torch orientations without removing and/or replacing the head portion of the plasma torch. Additionally, head portion 33 is connected to torch body 31 of plasma torch 16 to allow infinitely variable two-dimensional positioning of head portion 33 relative to torch body 31. Head portion 33 is constructed to generate a cutting arc at a plurality of angles relative to torch body 31. Such a construction provides a plasma torch applicable to multiple applications and thereby increases process efficiencies. That is, rather than changing a torch head or replacing the entire torch, an operator can quickly and repeatedly orient the torch head in a desired position.

Therefore, the present invention includes a plasma cutting torch having a torch body and a torch head. The torch head has a restricted pivotable connection to the torch body and is configured to generate a cutting arc at a plurality of angles relative to the torch body.

Another embodiment of the present invention includes a plasma cutting assembly having a power source. A plasma torch is electrically connectable to the power source and a multi-position head is ratchetably connected to the plasma torch.

An alternate embodiment of the present invention includes a plasma torch having a handle portion and a work tip portion. The plasma torch includes means for providing restricted adjustment of a position of the work tip portion relative to the handle portion when the work tip portion is connected to the handle portion.

The present invention has been described in terms of the preferred embodiment, and it is recognized that equivalents, alternatives, and modifications, aside from those expressly stated, are possible and within the scope of the appending claims.

What is claimed is:

1. A plasma cutting torch comprising:

a torch body having a handle which extends from a first end to a second end, the first end being fixed with respect to the second end; and a torch head having a restricted pivotable connection to the torch body and configured to generate a cutting arc at a plurality of angles relative to the torch body, wherein the restricted pivotable connection includes a plurality of predefined set points.

2. The plasma cutting torch of claim 1 wherein the restricted pivotable connection includes an infinitely variable connection limitied to two axes.

3. The plasma cutting torch of claim 1 further comprising an index mechanism disposed between the torch body and the torch head and constructed to indicate position of the torch head relative to the torch body at each predefined set point.

4. The plasma cutting torch of claim 1 wherein the torch head is pivotable about no more than two axes.

5. The plasma cutting torch of claim 1 wherein the torch head pivots from a position generally aligned with an axis of the torch body to a position generally transverse to the axis of the torch body.

6. The plasma cutting torch of claim 1 wherein the torch head is pivotable from approximately 75 degrees through to 180 degrees.

7. The plasma cutting torch of claim 1 further comprising an electrode disposed within the torch head.

8. The plasma cutting torch of claim 7 further comprising a cup removably attached to the torch head and constructed to center the electrode therein.

9. A plasma cutting assembly comprising:

a power source;

a plasma torch electrically connectable to the power source; and a multi-position head ratchetably connected to the plasma torch.

10. The plasma cutting assembly of claim 9 further comprising an electrode positioned in the multi-position head and in electrical communication with the power source when the plasma torch is connected thereto.

11. The plasma cutting assembly of claim 9 further comprising a hinge connecting the multi-position head and the plasma torch.

12. The plasma cutting assembly of claim 11 further comprising a ratchet mechanism constructed to secure the multi-position head at predetermined positions relative to the plasma torch.

13. The plasma cutting assembly of claim 12 wherein the ratchet mechanism provides restricted ratchetable rotation of the multi-position head from 90 degrees relative to the plasma torch, 135 degrees relative to the plasma torch, 170 degrees relative to the plasma torch, and 180 degrees relative to the plasma torch.

14. The plasma cutting assembly of claim 9 wherein the plasma torch and multi-position head are in a common plane through a range of rotation of the multi-position head.

15. The plasma cutting assembly of claim 9 further comprising a cap connected to an end of the multi-position head generally opposite an end of the multi-position head connected to the torch and constructed to removably secure an electrode in the multi-position head.

* * * * *